June 24, 1941.   W. E. WILLIAMS   2,246,651
RESILIENT WHEEL
Filed July 29, 1940

INVENTOR.
WILLIAM E WILLIAMS.
ATTORNEY.

Patented June 24, 1941

2,246,651

UNITED STATES PATENT OFFICE 2,246,651

RESILIENT WHEEL

William E. Williams, Vancouver, British Columbia, Canada

Application July 29, 1940, Serial No. 348,200

3 Claims. (Cl. 152—40)

My invention relates to improvements in resilient wheels the object of which are to provide means for supporting heavy loads and withstanding heavy torque without causing fatigue or disintegrating strain or movement on the yielding elements of the wheel and also to provide a structure in which the tire and rim of the wheel may be replaced if required as a roadside replacement.

The invention consists of a pair of spaced discs supporting a star shaped spacer, a resilient element surrounding the spacer and a floating member surrounding the resilient element, upon which floating member a rim and tire are supported, as will be more fully described in the following specification and shown in the accompanying drawing in which.

In the drawing like characters of reference indicate corresponding parts in each figure.

Figures 1, 2:
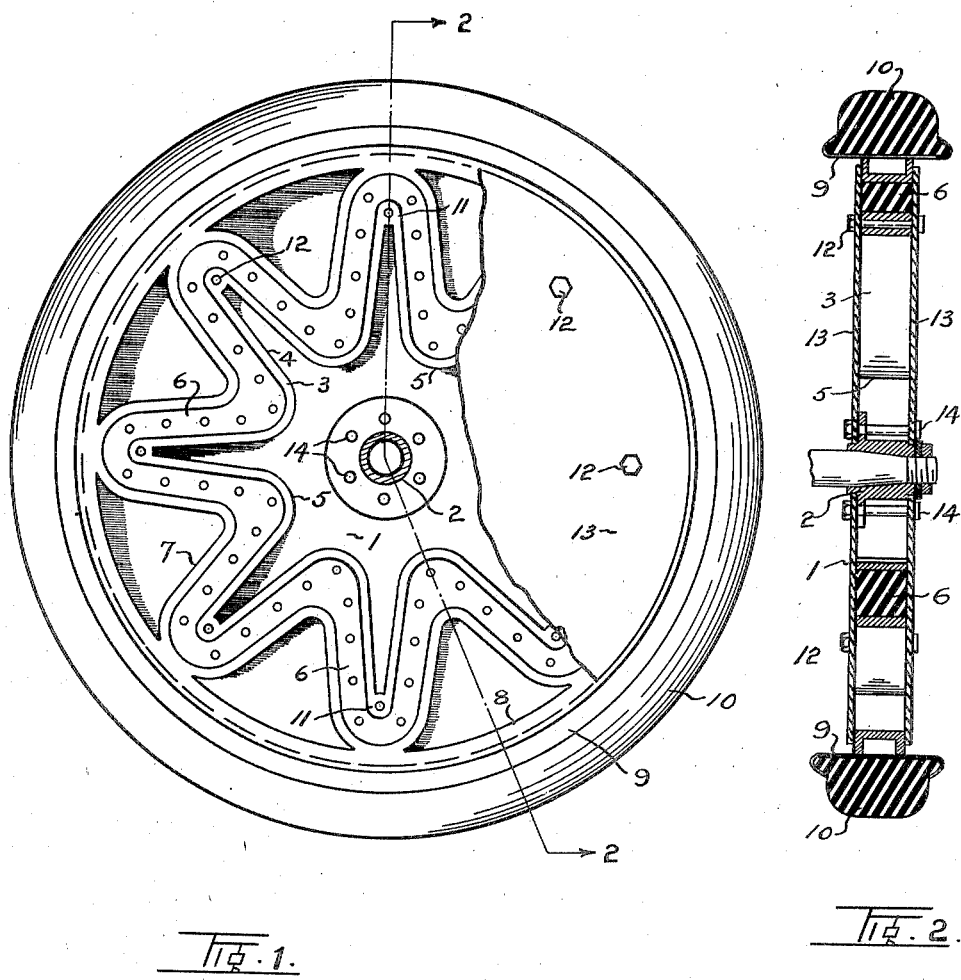
Fig. 1 is an elevational view of the wheel with a portion of one disc removed.
Fig. 2 is a sectional view taken on the line 2—2 of Figure 1.

The numeral 1 indicates a disc fitted with a hub 2 and secured concentrically upon the disc is a star shaped spacer 3 which is formed of straight portions or flights 4, each at a tangent to the periphery of the disc and substantially semi-circular portions 5 which connect adjacent ends of the portions 4 together. A ribbon of relatively soft rubber 6 is fitted around the outer periphery of the star shaped spacer 3, the resiliency of which would be determined by the maximum load and torque to be applied to the wheel.

A star shaped band 7 of the same contour as the rubber or resilient element 6 is encircled with an annular felly 8 to which it is secured by welding or otherwise. The felly 8 and the band 7 are slightly less in width than the spacer 3 to permit free radial movement within the wheel. Fitted upon the felly 8 is a rim 9 upon which any desired type of rubber tire 10 is mounted.

The outer semi-circular portions 5 of the spacer 3 are apertured as at 11 to receive bolts 12 which serve to secure an outer disc 13 to the disc 3. Bolts 14 extend through the discs at the hub to complete the wheel.

In use the load upon the wheel is transmitted to the point of contact of the tire with the ground through the resilient member 6 as is also the torque between the axle and the tire. The strain imposed upon the rubber is mainly compressive and the length of the ribbon normally supporting the load and taking the torque of the drive is equal to the combined length of each of the tangential portions or flights of said ribbon, such lengths being computed upon a horizontal line, viz: the effective supporting length of any of the tangential portions of the ribbon would be the horizontal distance between the inner and the outer end of such tangential portion or between the inner and outer end of the contacting flight 4 of the spacer 3. In the embodiment shown, the load carried by a given area of ribbon would be about one fortieth of the load taken by a similar area of that portion of the tire which is bearing upon the ground. Consequently very soft pliable material may be used which is capable of constant flexure without breakdown or fatigue.

What I claim as my invention is:

1. A resilient wheel comprising side members spaced apart, a star shaped member secured concentrically between the side members, each point of the star shaped member forming a pair of straight flights arranged at an acute angle, a star shaped band between the side members, said band having straight portions normally parallel to the straight flights and a felly rim surrounding said star shaped band, and resilient material filling the interspace between each straight flight and its cooperating straight portion of the star shaped band.

2. A resilient wheel comprising side members spaced apart, a star shaped member secured concentrically between the side members, each point of the star shaped member forming a pair of straight flights arranged at an acute angle, a star shaped band between the side members, said band having straight portions normally parallel to the straight flights and a felly rim surrounding said star shaped band, and resilient material filling the interspace between each straight flight and its cooperating straight portion of the star shaped band, the inner ends of adjacent straight flights being connected together and the outer ends of adjacent straight portions of the star shaped band being connected together to define intervening spaces, said intervening spaces being filled with resilient material.

3. A resilient wheel comprising side members spaced apart, a star shaped member secured concentrically between the side members, each point of the star shaped member forming a pair of straight flights arranged at an acute angle, a star shaped band between the side members, said band having straight portions normally parallel to the straight flights and a felly rim surrounding said star shaped band, and resilient material filling the interspace between each straight flight and its cooperating straight portion of the star shaped band, the outer ends of adjacent straight flights being connected together and the inner ends of adjacent straight portions of the star shaped band being connected together to define intervening spaces, said intervening spaces being filled with resilient material.

WILLIAM E. WILLIAMS.